(12) United States Patent
Weigl

(10) Patent No.: US 11,280,552 B2
(45) Date of Patent: Mar. 22, 2022

(54) HEAT EXCHANGER SYSTEM FOR TRANSMITTING THE EXHAUST GAS HEAT OF AN INTERNAL COMBUSTION ENGINE

(71) Applicant: CPT Group GmbH, Hannover (DE)

(72) Inventor: Manfred Weigl, Sinzing (DE)

(73) Assignee: VITESCO TECHNOLOGIES GMBH, Hannover (DE)

( * ) Notice: Subject to any disclaimer, the term of this patent is extended or adjusted under 35 U.S.C. 154(b) by 280 days.

(21) Appl. No.: 16/487,572

(22) PCT Filed: Feb. 12, 2018

(86) PCT No.: PCT/EP2018/053404
§ 371 (c)(1),
(2) Date: Aug. 21, 2019

(87) PCT Pub. No.: WO2018/153709
PCT Pub. Date: Aug. 30, 2018

(65) Prior Publication Data
US 2019/0383257 A1 Dec. 19, 2019

(30) Foreign Application Priority Data
Feb. 22, 2017 (DE) .................... 10 2017 202 871.8

(51) Int. Cl.
*F02G 5/02* (2006.01)
*F28D 7/10* (2006.01)
(Continued)

(52) U.S. Cl.
CPC ............ *F28D 7/10* (2013.01); *F01N 5/02* (2013.01); *F02G 5/02* (2013.01); *F28D 7/16* (2013.01);
(Continued)

(58) Field of Classification Search
CPC ..................................... F01N 5/02; F02G 5/02
See application file for complete search history.

(56) References Cited

U.S. PATENT DOCUMENTS

| | | | | |
|---|---|---|---|---|
| 4,513,572 A | * | 4/1985 | Bonnaud | F02B 37/168 60/618 |
| 4,896,830 A | * | 1/1990 | Takamatsu | F02B 75/005 237/12.1 |

(Continued)

FOREIGN PATENT DOCUMENTS

| | | | |
|---|---|---|---|
| DE | 10 2005 046 514 | 4/2007 | ............... F01M 5/02 |
| DE | 10 2007 039 890 | 4/2008 | ............. F28D 15/02 |

(Continued)

OTHER PUBLICATIONS

Search Report for International Application No. PCT/EP2018/053404, 11 pages, dated Mar. 23, 2018.

(Continued)

*Primary Examiner* — Ngoc T Nguyen
(74) *Attorney, Agent, or Firm* — Slayden Grubert Beard PLLC

(57) ABSTRACT

Various embodiments include a system for transmitting heat from an exhaust gas of an internal combustion engine to a working medium comprising: a first heat exchanger connected to the exhaust gas; a second heat exchanger connected to the working medium and the first heat exchanger; and a heat transmission medium arranged in a predetermined heat exchanger volume and substantially completely in a liquid state with a predetermined volume of heat transmission medium at room temperature and normal pressure. The heat exchangers define the hermetically sealed heat exchanger volume. The heat transmission medium transmits heat from the exhaust gas to the working medium. A ratio between the predetermined volume of the heat transmission medium and the predetermined heat exchanger volume is set (Continued)

such that the heat transmission medium is substantially completely in a gaseous state when a temperature of the exhaust gas exceeds a threshold value.

9 Claims, 1 Drawing Sheet

(51) Int. Cl.
    *F01N 5/02*     (2006.01)
    *F28D 7/16*     (2006.01)
    *F28D 15/02*     (2006.01)
    *F01M 5/00*     (2006.01)

(52) U.S. Cl.
    CPC ..... *F28D 15/0233* (2013.01); *F28D 15/0266* (2013.01); *F28D 15/0275* (2013.01); *F01M 5/001* (2013.01)

(56) References Cited

U.S. PATENT DOCUMENTS

| | | | | |
|---|---|---|---|---|
| 6,564,545 B1 * | 5/2003 | Dong | ................... | F01N 3/2889 60/289 |
| 7,832,201 B2 | 11/2010 | Bremm | ........................... | 60/295 |
| 7,832,204 B2 | 11/2010 | Bidner | ........................... | 60/320 |
| 8,020,524 B2 | 9/2011 | Miyagawa | ................. | 123/41.33 |
| 8,739,521 B2 * | 6/2014 | Umeno | ................... | F28D 7/022 60/320 |
| 2009/0020260 A1 | 1/2009 | Miyagawa | ...................... | 165/41 |
| 2009/0277173 A1 * | 11/2009 | Ernst | ..................... | F01K 23/065 60/616 |
| 2013/0037235 A1 | 2/2013 | Sakabe | ........................... | 165/41 |

FOREIGN PATENT DOCUMENTS

| | | | | |
|---|---|---|---|---|
| DE | 10 2007 045 218 | 4/2009 | ............ | F01M 5/02 |
| EP | 2472208 | 7/2012 | ............ | F28D 15/02 |
| GB | 1435345 | 5/1976 | ............ | F01N 3/14 |
| GB | 2013863 | 8/1979 | ............ | F28D 15/00 |
| JP | 2007046469 | 2/2007 | ............ | F01N 5/02 |
| WO | 2009/112946 | 9/2009 | | |

OTHER PUBLICATIONS

Office Action for German Application No. 10 2017 202 871.8, 7 pages, dated Dec. 7, 2017.

P.D. Dunn, "Heat Pipes," 3 pages, Jun. 14, 1994.

* cited by examiner

HEAT EXCHANGER SYSTEM FOR TRANSMITTING THE EXHAUST GAS HEAT OF AN INTERNAL COMBUSTION ENGINE

CROSS-REFERENCE TO RELATED APPLICATIONS

This application is a U.S. National Stage Application of International Application No. PCT/EP2018/053404 filed Feb. 12, 2018, which designates the United States of America, and claims priority to DE Application No. 10 2017 202 871.8 filed Feb. 22, 2017, the contents of which are hereby incorporated by reference in their entirety.

TECHNICAL FIELD

The present disclosure relates to heat exchanger systems. Various embodiments may include systems for transmitting the heat of an exhaust gas of an internal combustion engine to at least one working medium of the internal combustion engine and/or an internal combustion engines.

BACKGROUND

The exhaust gas of an internal combustion engine reaches a high temperature even shortly after a cold start of the internal combustion engine and could accordingly be used as a thermal energy source. An exemplary application for using this exhaust gas heat shortly after a cold start of the internal combustion engine is the heating of working media of the internal combustion engine, e.g. the engine and transmission oils or coolant, in order to bring the working media up to their respective operating temperatures in a shorter time.

Because of the great temperature range of the exhaust gas, one problem with such exhaust gas heat exchangers is that the heat exchanger must supply the surplus thermal energy to the working media at low exhaust temperatures. When high exhaust gas temperatures are reached, the heat transport from the hot exhaust gas to the working media of the internal combustion engine must be stopped. Consequently, such a heat exchanger must be configured so as not to implement a heat transfer from the exhaust gas to the working media of the internal combustion engine at maximal temperatures in the exhaust gas line.

In the prior art, attempts have already been made to interrupt the thermal conduction in heat exchanger systems at high exhaust gas temperatures. Such switchable heat exchangers provide a modified thermal conduction by porous substances depending on a defined gas content. Further possibilities for avoiding high temperatures in the heat exchanger system include a switchable exhaust gas bypass. It is also known to utilise the Seebeck effect for direct provision of electrical energy from the temperature difference between the exhaust gas and the working medium. However, such solutions already known in the prior art usually entail a substantial extra cost and additional installation space. US 2013/0037235 A1, U.S. Pat. No. 8,020,524 B2 and JP 2007/046469 A each disclose exhaust gas heat recovery devices. U.S. Pat. No. 7,832,204 B2 concerns a motor system with a heatpipe.

SUMMARY

The teachings of the present disclosure describe heat exchanger systems configured to transmit the heat of the exhaust gas of the internal combustion engine at least partially to a working medium of an internal combustion engine, in particular shortly after a cold start of the internal combustion engine. For example, some embodiments include a heat exchanger system (30) for transmitting the heat of an exhaust gas of an internal combustion engine (10) to at least one working medium of the internal combustion engine (10), wherein the heat exchanger system (30) comprises: a first heat exchanger (32) which is operatively connected to the exhaust gas, a second heat exchanger (34) which is operatively connected to the at least one working medium and is fluidically connected to the first heat exchanger (32), wherein the first heat exchanger (32) and the second heat exchanger (34) define a hermetically sealed, predetermined heat exchanger volume, and a heat transmission medium (38) which is arranged in the predetermined heat exchanger volume and is substantially completely in the liquid state at room temperature and normal pressure, and has a predetermined volume of heat transmission medium at room temperature and normal pressure, wherein the heat transmission medium (38) is configured to transmit the heat from the exhaust gas of the internal combustion engine (10) to the working medium of the internal combustion engine (10), wherein the ratio between the predetermined volume of heat transmission medium and the predetermined heat exchanger volume is set such that the heat transmission medium (38) is substantially completely in the gaseous state when the temperature of the exhaust gas exceeds a predetermined threshold value.

In some embodiments, there is a connecting line (36) which is configured to fluidically connect the first heat exchanger (32) to the second heat exchanger (34).

In some embodiments, the first heat exchanger (32) and the second heat exchanger (34) are arranged relative to each other such that the heat transmission medium (38) in gaseous state can flow from the first heat exchanger (32) into the second heat exchanger (34), and that the heat transmission medium (38) which has condensed in the second heat exchanger (34) can flow into the first heat exchanger (32) under the effect of gravity.

In some embodiments, there is a gas introduced into the heat exchanger volume, e.g. an inert gas, which at room temperature and normal pressure has a predetermined gas volume which is configured to change the predetermined threshold value in the desired manner.

In some embodiments, the heat transmission medium comprises water and/or ammonia and/or hydrocarbons and/or butane.

In some embodiments, the predetermined threshold corresponds to a temperature at which the working medium of the internal combustion engine (10) has reached its operating temperature.

In some embodiments, the predetermined threshold value lies in a range between around 40° C. and around 200° C., between around 50° C. and around 90° C., or is around 60° C.

As another example, some embodiments include an internal combustion engine (10) with: a cooling water system for cooling the internal combustion engine (10), a lubricating oil system for lubricating moving elements of the internal combustion engine (10), an exhaust gas pipe (22) for discharging exhaust gas from the internal combustion engine (10), and a heat exchanger system (30) as described above, wherein the heat exchanger system (30) is configured to conduct heat from the exhaust gas to the cooling water system and/or the lubricating oil system.

In some embodiments, there is a catalyst device (24) which is configured to at least partially aftertreat the exhaust gas, wherein the first heat exchanger (32) of the heat exchanger system (30) is configured to be operatively connected to the exhaust gas flowing through the exhaust gas pipe (22) at a position downstream of the catalyst device (24).

In some embodiments, there is a particle filter (26) which is configured to at least partially capture particles present in the exhaust gas, wherein the first heat exchanger (32) of the heat exchanger system (30) is configured to be operatively connected to the exhaust gas flowing through the exhaust gas pipe (22) at a position upstream of the particle filter (26).

BRIEF DESCRIPTION OF THE DRAWINGS

Further features and objects of the teachings of the present disclosure become apparent to a person skilled in the art by practising the present teaching and taking into consideration the accompanying drawings, in which.

DETAILED DESCRIPTION

Figure 1:
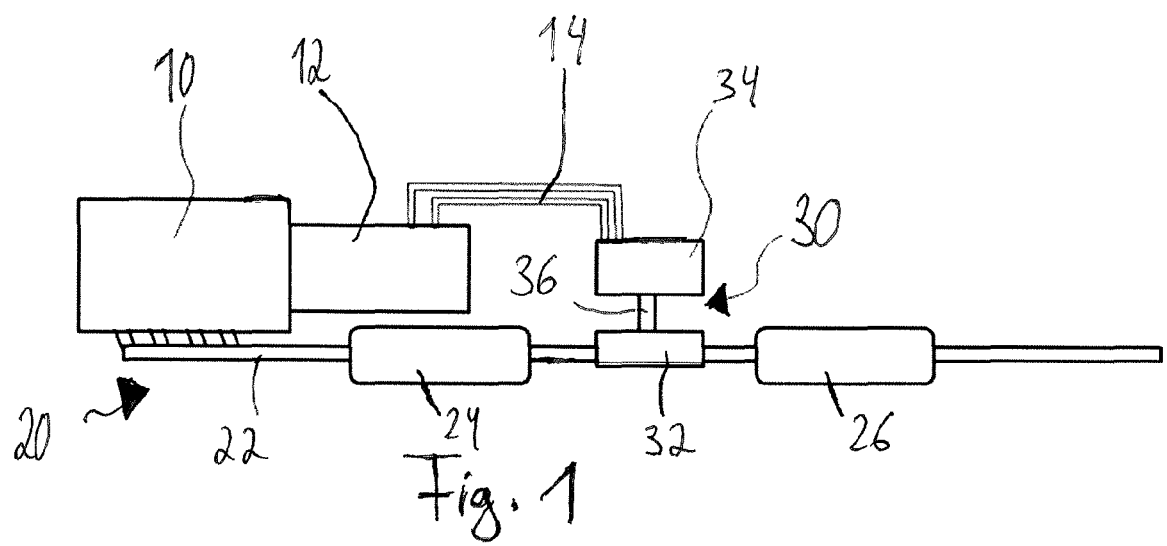
FIG. 1 shows a diagrammatic view of an internal combustion engine with exhaust gas line.

Some embodiments of the teachings herein include a special heatpipe heat exchanger system which has a hermetically sealed volume. By suitably setting the size of the hermetically sealed volume and introducing a predetermined volume of a heat transmission medium into this hermetically sealed volume, a self-controlling heat exchanger system can be provided which requires no separate or further control components and consequently is low-cost.

Some embodiments include a heat exchanger system for transmitting the heat of an exhaust gas of an internal combustion engine to at least one working medium of the internal combustion engine. One example heat exchanger system comprises a first heat exchanger which is operatively connected to the exhaust gas, and a second heat exchanger which is operatively connected to the at least one working medium and is fluidically connected to the first heat exchanger. The first heat exchanger and the second heat exchanger together define a hermetically sealed, predetermined heat exchanger volume.

The example heat exchanger system furthermore comprises a heat transmission medium which is arranged in the predetermined heat exchanger volume and is substantially completely in the liquid state at room temperature and normal pressure, and has a predetermined volume of heat transmission medium at room temperature and normal pressure. The heat transmission medium is configured to transmit the heat of the exhaust gas of the internal combustion engine to the working medium of the internal combustion engine. Here, the ratio between the predetermined volume of heat transmission medium and the predetermined heat exchanger volume is set such that the heat transmission medium is substantially completely in the gaseous state when the temperature of the exhaust gas exceeds a predetermined threshold value.

The heat conduction property of the heat transmission medium when substantially completely in the gaseous state is negligibly small, and consequently the heat transmission from the exhaust gas to the working medium almost disappears. By predetermined setting of the ratio between the predetermined volume of heat transmission medium and the predetermined heat exchanger volume, taking into account the vapor pressure table of the heat transmission medium, the exhaust gas temperature above which the heat transmission from the exhaust gas to the working medium of the internal combustion engine is to be interrupted, can be set as desired, since the heat transmission is negligible when the heat transmission medium has substantially completely evaporated. The phase transitions from liquid to gaseous and gaseous to liquid ensure an efficient heat transport since the phase transitions require energy in the form of heat.

In some embodiments, a connecting line is provided which is configured to fluidically connect the first heat exchanger to the second heat exchanger. Here, the volume of the connecting line is taken into account in the predetermined heat exchanger volume, so that the ratio according to the invention between the predetermined volume of heat transmission medium and the predetermined heat exchanger volume is set as described above.

In some embodiments, the first heat exchanger and the second heat exchanger are arranged relative to each other such that the heat transmission medium in gaseous state can flow from the first heat exchanger into the second heat exchanger, and the heat transmission medium which has condensed in the second heat exchanger can flow into the first heat exchanger under the effect of gravity. Preferably, the second heat exchanger is arranged substantially above the first heat exchanger.

In some embodiments, a gas is introduced into the heat exchanger volume, e.g., an inert gas, which has a predetermined gas volume at room temperature and normal pressure. The introduced gas is configured to change the predetermined threshold value in a desired manner.

In some embodiments, the heat transmission medium comprises water and/or ammonia and/or hydrocarbons and/or butane, and or any further suitable heat transmission medium for transmitting the heat of the exhaust gas to a working medium of the internal combustion engine. In some embodiments, the heat transmission medium is selected such that when used in the heat exchanger system, it has a greatest possible volume in liquid state so as to maximize the surface area of the liquid heat transmission medium, and consequently the greatest possible area for heat transmission with the exhaust pipe can be provided. For example, the working medium of the internal combustion engine may be the cooling water of the internal combustion engine, and/or engine oil of the internal combustion engine, and/or transmission oil of the internal combustion engine.

On a cold start of the internal combustion engine, heat transmission medium in liquid state only boils when the pressure in the liquid heat transmission medium is lower than the corresponding vapor pressure, and the so-called limit temperature (below which the heat transmission is interrupted) can be set by the additional filling of the gas, e.g. inert gas. The usage temperature may be predefined via the filling pressure from the known curve of boiling temperature over pressure. This function may however only be necessary if a component requires with priority a minimum temperature downstream of the heat exchanger in the exhaust gas line. Since however a highest possible usage temperature has top priority for exhaust gas aftertreatment, the heat exchanger system may be arranged downstream of the catalyst system in the flow direction. Thus, the temperature curve of the catalyst system cannot be adversely affected by heat extraction.

In some embodiments, the predetermined threshold value corresponds to a temperature at which the working medium of the internal combustion engine has reached its operating temperature. This means that, on reaching the predetermined threshold value, the heat transmission of the exhaust gas heat to the working medium is interrupted, and accordingly from this time no heat transmission takes place from the exhaust gas to the working medium of the internal combustion engine. This may prevent the working medium from being heated above its optimal operating temperature. In some embodiments, the predetermined threshold value lies in a range between around 40° C. and around 20° C., preferably between around 50° C. and around 90° C. If the working medium of the internal combustion engine is a transmission oil, it is most preferred if the predetermined threshold temperature is around 60° C.

Some embodiments include an internal combustion engine which comprises a cooling water system for cooling the internal combustion engine, a lubricating oil system for lubricating moving elements of the internal combustion engine, an exhaust gas pipe for discharging exhaust gas from the internal combustion engine, and a heat exchanger system according to the invention, which is configured to conduct heat from the exhaust gas to the cooling water system and/or the lubricating oil system.

In some embodiments, a catalyst device is provided which is configured to at least partially aftertreat the exhaust gas. Here, the first heat exchanger of the heat exchanger system is configured to be operatively connected to the exhaust gas at a position downstream of the catalyst device.

In some embodiments, a particle filter is provided, for example a diesel particle filter, which is configured to at least partially capture particles present in the exhaust gas. The thermal capacity of the particle filter delays the temperature rise at the heat exchanger. In order to avoid this delay, the first heat exchanger of the heat exchanger system may be configured to be operatively connected to the exhaust gas at a position upstream of the particle filter.

In some embodiments, the heat from the exhaust gas may be available for heating lubricating oil and/or cooling water at an earlier time, since the thermal capacity of the particle filter cannot delay the temperature rise at the heat exchanger.

In the context of the present disclosure, an "operative connection" between two components means that the two components stand in mutual thermodynamic exchange. In particular, an "operative connection" describes a thermodynamic relationship between these two components. This means that the heat from one of the two components can be transmitted to the other of the two components (and vice versa). In the present example, this means that, in particular, the exhaust gas emits its heat to the heat transmission medium, and in turn the heat transmission medium transmits the heat obtained from the exhaust gas to the working medium.

The teachings of the present disclosure are described in more detail below in relation to a specific example with reference to FIGS. 1 and 2. The example shows the heat transmission of the exhaust gas heat to the lubricating oil of a transmission of the internal combustion engine. The person skilled in the art will however gather that the principles of the heat exchanger system disclosed may also be used to transmit the exhaust gas heat to other working media, for example to the coolant of the internal combustion engine or to the lubricating oil of the internal combustion engine.

FIG. 1 shows a diagrammatic view of an internal combustion engine 10 to which an exhaust gas line 20 is connected. A transmission 12 is connected to the internal combustion engine 10, which the example shown is a combustion engine with internal combustion. The exhaust gas line 20 comprises an exhaust gas pipe 22 which conducts the exhaust gas initially through a catalyst device 24 and then through a particle filter 26 before the exhaust gas is discharged to the environment. A heat exchanger system 30 is provided between the catalyst device 24 and the particle filter 26 to transmit the heat of the exhaust gas, flowing through the exhaust gas pipe 22 of the internal combustion engine 10, to a working medium of the internal combustion engine 10.

In the example shown in FIG. 1, the heat exchanger system 30 is configured to transmit the heat of the exhaust gas to the lubricating oil of the transmission 12, in particular in a time period shortly following a cold start of the internal combustion engine 10. At this time, the transmission lubricating oil has not yet reached is optimal operating temperature, so by means of the heat exchanger system 30 according to the invention, the exhaust gas heat—which has already reached an adequate level shortly after cold start of the internal combustion engine—may be used to bring the transmission lubricating oil up to its optimal operating temperature early.

The heat exchanger system 30 comprises a first heat exchanger 32, a second heat exchanger 34, and a connecting line 36 which fluidically connects the first heat exchanger 32 to second heat exchanger 34. Lubricating oil lines 14, through which the lubricating oil of the transmission 12 may flow, extend between the second heat exchanger 34 and the transmission 12. The lubricating oil lines 14 are arranged such that the second heat exchanger 34 is operatively connected to the lubricating oil flowing through the lubricating oil lines 14. In the embodiment shown, the lubricating oil is an example of a working medium of the internal combustion engine 10.

The delay caused by the heat extraction by means of the heat exchanger system 30 upstream of the particle filter 26, during the warm-up phase of the internal combustion engine 10, is scarcely disadvantageous for the function of the particle filter 26 since the efficacy of the particle filter 26 is retained even at low temperatures; here, high temperatures are required solely for regeneration of the particle filter 26 and would not in any case be available in the warm-up phase. The available time windows for particle filter regeneration are thus only restricted to a negligible extent.

Exhaust gas treatment functions may however be combined in present and future engine systems. For this reason, the particle filter 26 is catalytically coated. A rapid temperature rise has priority for the catalytic coating. Therefore, the particle filter 26 is usually also fitted close to the engine. In these engine systems, the heat exchanger system 30 may only be installed downstream of the exhaust gas aftertreatment components, in order not to delay the temperature rise in the components of the exhaust gas system. Nonetheless, the heat exchanger system 30 is advantageous since it is effective even at relatively low exhaust gas temperatures because the coolant and lubricating oils in any case only require heating to maximal temperatures of around 100° C.

Figure 2:
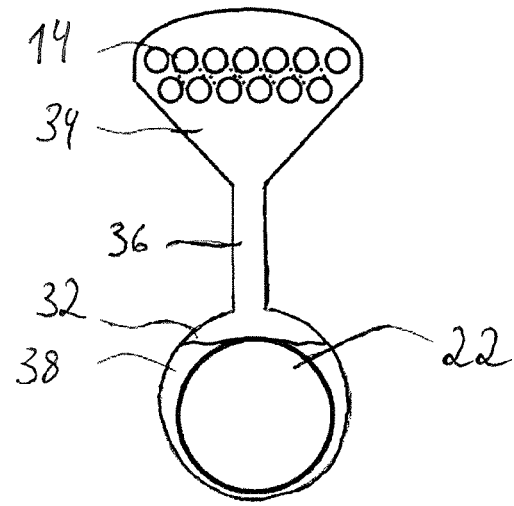
FIG. 2 shows a sectional view through an example heat exchanger system incorporating teachings of the present disclosure.

FIG. 2 shows a sectional view through the heat exchanger system 30 of FIG. 1. It is evident from FIG. 2 that the first heat exchanger 32 is operatively connected to the exhaust gas flowing through the exhaust gas pipe 22. More precisely, the heat exchanger is arranged substantially around the exhaust gas pipe 22, wherein a gap in which a heat transmission medium 38 is arranged is present between the wall of the exhaust gas pipe 22 and the wall of the heat exchanger 32.

The second heat exchanger 34 is arranged substantially around the lubricating oil lines 14 such that the second heat exchanger 34 is operatively connected to the lubricating oil flowing through the lubricating oil lines 14. In order to achieve a high heat transmission from the heat transmission medium 38 to the lubricating oil, it is preferred if the lubricating oil lines 14 are arranged in the form of a pipe snake. In this way, the heat transmission surface area or condensation area of the heat transmission medium 38 at the lubricating oil is increased.

The connecting line 36 which fluidically connects the first heat exchanger 32 to the second heat exchanger 34 is arranged between the first heat exchanger 32 and the second heat exchanger 34. As FIGS. 1 and 2 show, the second heat exchanger 34 may be arranged substantially above the first heat exchanger 32, such that the heat transmission medium 38 evaporated in the first heat exchanger 32 can rise unhindered from the first heat exchanger 32 into the heat exchanger 34. On the other hand, the connecting line 36 allows the heat transmission medium 38 which has condensed on the lubricating oil lines 14 to flow back under gravity unhindered from the second heat exchanger 34 to the first heat exchanger 32.

The first heat exchanger 32, the second heat exchanger 34 and the connecting line 36 together define a hermetically sealed, predetermined heat exchanger volume. Hermetically sealed means that the walls of the heat exchanger volume are completely diffusion-tight. In some embodiments, the heat exchanger system 30 comprises no organic seals or moveable passages, but may be made substantially completely of corrosion-resistant steel using exclusively weld connections. Thus, the hermetic seal and hence the function of the heat exchanger system 30 can be reliably achieved over the entire service life of the vehicle.

The heat transmission medium 38 may be arranged or introduced into the predetermined heat exchanger volume. The heat transmission medium is present substantially completely in liquid state at room temperature and normal pressure and has a predetermined heat transmission volume at room temperature and normal pressure. In the context of the present disclosure, the term "room temperature" means a temperature of around 22° C., and "normal pressure" describes a pressure of around 1 bar or approximately 1013 hPa.

The heat transmission medium 38 may be introduced in that the heat transmission medium is introduced in gaseous (or vaporous) state into the heat exchanger volume until a desired internal pressure is reached in the heat exchanger volume. This may achieve that, after cooling of the heat transmission medium 38 inside the heat exchanger volume, a pressure is set which corresponds substantially to the vapor pressure of the heat transmission medium 38 at the respective temperature. The remaining "free" volume of the heat exchanger volume is preferably evacuated. If liquid is present in a closed container and only takes up part of this container volume, and no further substance is added, a pressure is set in the residual volume part which corresponds to the gas pressure of the liquid at the respective temperature.

If this equilibrium is destroyed by temperature rise, the liquid begins to boil until the pressure has increased so far that it corresponds to the equilibrium vapor pressure at the current temperature. This also means that the heat exchanger system 30 is always active as soon as the temperature rise occurs at the first heat exchanger 32, since the liquid begins to boil at the first heat exchanger 32 and condenses again at the second heat exchanger 34.

If a defined minimum temperature is required for the start of heat transport, the heat exchanger system 30 may be filled with an additional substance which remains gaseous over the entire ambient temperature range. This may be air or—in order to exclude any chemical reaction with the two substances—an inert gas. In such a heat exchanger system 30, the partial pressures of the two substances are cumulated. This means that the liquid in the interior has a higher pressure than its own partial pressure and does not therefore boil even if the partial pressure of the vapor on temperature rise of the liquid is lower than the corresponding equilibrium partial pressure. The equilibrium partial pressure is thus only reached slowly by diffusion and evaporation from the liquid surface. The liquid only begins to boil when, on further temperature rise, the vapor pressure of the liquid exceeds the internal pressure of the heat exchanger system 30, which then leads to an efficient heat transport.

In some embodiments, the volume of heat transmission medium and the heat exchanger volume stand in a predetermined ratio to each other, such that the heat transmission medium is substantially completely in the gaseous state when the temperature of the exhaust gas exceeds a predetermined threshold value. As the exhaust gas temperature increases, the wall of the exhaust gas pipe 22 also heats up. This further heats the heat transmission medium 38. In systems without additional gas filling, the heat transmission medium 38 begins to boil early since, on heating, the equilibrium vapor pressure inside the heat exchanger volume rises and thereby exceeds the momentary pressure. The resulting evaporated heat transmission medium 38 rises because of the pressure rise, up through the connecting line 36 into the second heat exchanger 34 and comes into contact with the still cool lubricating oil lines 14 where it can condense. Since therefore, because of the lower temperature, the vapor pressure in the second heat exchanger 34 remains low, a continuous vapor flow occurs.

During condensation, the vaporous heat transmission medium at least partially transfers its energy to the lubricating oil lines and hence to the lubricating oil and returns to the liquid state. The condensed heat transmission medium 38 then flows back under the influence of gravity through the connecting line 36 into the first heat exchanger 32, where it can be evaporated again.

During this process, exhaust gas energy is continuously transferred to the lubricating oil, whereby after a cold start of the internal combustion engine 10, the lubricating oil can be brought to operating temperature more quickly.

Since lubricating oil should not be excessively heated because of corrosion and ageing, it is necessary for the heat transmission from the exhaust gas to the transmission oil to be interrupted above a predefined exhaust gas temperature. This may take place automatically with the heat exchanger system 30 according to the invention, in that as the temperature of the heat exchanger system 30 rises, the internal pressure rises and hence the proportion of liquid heat transmission medium 38 falls. At the same time, the proportion of gaseous heat transmission medium 38 rises.

On reaching a predetermined exhaust gas temperature, the heat transmission medium 38 is substantially completely in the gaseous state and almost no further heat transport can take place via the heat transmission medium stored in gaseous state. Heat transmission can take place only via the walls of the first heat exchanger 32, the connecting line 36 and the second heat exchanger 34 and is negligibly small.

Thus, by targeted setting of the ratio between the predetermined volume of heat transmission medium and the predetermined heat exchanger volume, an automatically self-controlling heat exchanger system 30 can be provided. It can also be ensured that the heat transport of the exhaust gas heat to the lubricating oil is substantially interrupted when the temperature of the exhaust gas exceeds a predetermined threshold value.

In an example in which water is used as the heat transmission medium, the heat exchanger volume may be approximately 2 l. In this example, a volume of only approximately 2.3 ml of water is required. This means that the heat exchanger volume is around 880 times greater than the volume of heat transmission medium. The predetermined exhaust gas temperature may here for example be around 120° C., at which an internal pressure of around 2 bar is set in the heat exchanger volume. In some embodiments, the heat exchanger system 30 is also integrated in a silencer, which would reduce the installation space and cost for mounting in the exhaust gas line.

In some embodiments, a further advantage of the heat exchanger system 30 is that the first heat exchanger 32 has very little or no influence on the exhaust gas back-pressure, as occurs with known systems with switchable bypass for controlling the heat exchanger system. Furthermore, by the provision of two separate heat exchangers 32, 34, it is ensured that the working medium (e.g. the lubricating oil of the transmission 12) of the internal combustion engine 10 does not stand in a direct heat exchange with the exhaust gas. Thus, protection can be achieved against overheating of the working medium of the internal combustion engine 10.

What is claimed is:

1. A heat exchanger system for transmitting the heat of an exhaust gas of an internal combustion engine to a working medium of the internal combustion engine, wherein the system comprises:
    a first heat exchanger operatively connected to the exhaust gas;
    a second heat exchanger operatively connected to the working medium and fluidically connected to the first heat exchanger;
    wherein the first heat exchanger and the second heat exchanger define a hermetically sealed, predetermined heat exchanger volume; and
    a heat transmission medium arranged in the predetermined heat exchanger volume and substantially completely in a liquid state at room temperature and normal pressure with a predetermined volume of heat transmission medium at room temperature and normal pressure;
    wherein the heat transmission medium transmits heat from the exhaust gas of the internal combustion engine to the working medium of the internal combustion engine;
    wherein a ratio between the predetermined volume of heat transmission medium and the predetermined heat exchanger volume is set such that the heat transmission medium is substantially completely in a gaseous state when a temperature of the exhaust gas exceeds a threshold value corresponding to a temperature at which the working medium of the internal combustion engine has reached its operating temperature.

2. The heat exchanger system as claimed in claim 1, further comprising a connecting line providing a fluid connection between the first heat exchanger and the second heat exchanger.

3. The heat exchanger system as claimed in claim 1, wherein:
    the heat transmission medium in the gaseous state can flow from the first heat exchanger into the second heat exchanger; and
    any of the heat transmission medium condensing in the second heat exchanger can flow into the first heat exchanger under the effect of gravity.

4. The heat exchanger system as claimed in claim 1, further comprising a gas introduced into the heat exchanger volume, wherein the gas has a predetermined gas volume at room temperature and normal pressure configured to change the predetermined threshold value in the desired manner.

5. The heat exchanger system as claimed in claim 1, wherein the heat transmission medium comprises at least one substance selected from the group consisting of: water, ammonia, hydrocarbons, and butane.

6. The heat exchanger system as claimed in claim 1, wherein the predetermined threshold value lies in a range between around 40° C. to around 200° C.

7. An internal combustion engine comprising:
    a cooling water system for cooling the internal combustion engine;
    a lubricating oil system for lubricating moving elements of the internal combustion engine;
    an exhaust gas pipe for discharging exhaust gas from the internal combustion engine;
    a first heat exchanger operatively connected to the exhaust gas pipe;
    a second heat exchanger fluidically connected to the first heat exchanger;
    wherein the first heat exchanger and the second heat exchanger define a hermetically sealed, predetermined heat exchanger volume; and
    a heat transmission medium arranged in the predetermined heat exchanger volume and substantially completely in a liquid state at room temperature and normal pressure with a predetermined volume of heat transmission medium at room temperature and normal pressure;
    wherein the heat transmission medium transmits heat from the exhaust gas of the internal combustion engine to the working medium of the internal combustion engine;
    wherein a ratio between the predetermined volume of heat transmission medium and the predetermined heat exchanger volume is set such that the heat transmission medium is substantially completely in a gaseous state when a temperature of the exhaust gas exceeds a predetermined threshold value;
    wherein the second heat exchanger conducts heat from the exhaust gas to the cooling water system and/or the lubricating oil system.

8. The internal combustion engine as claimed in claim 7, further comprising a catalyst device configured to at least partially treat the exhaust gas;
    wherein the first heat exchanger is operatively connected to the exhaust gas flowing through the exhaust gas pipe at a position downstream of the catalyst device.

9. The internal combustion engine as claimed in claim 7, further comprising a particle filter to at least partially capture particles present in the exhaust gas;
    wherein the first heat exchanger is operatively connected to the exhaust gas flowing through the exhaust gas pipe at a position upstream of the particle filter.

* * * * *